United States Patent [19]

Yamatoh et al.

[11] Patent Number: 4,860,859
[45] Date of Patent: Aug. 29, 1989

[54] BRAKE DEVICE

[75] Inventors: Kouhei Yamatoh; Masami Ogura, both of Saitama, Japan

[73] Assignee: Honda Giken Kogyo Kabushiki Kaisha, Tokyo, Japan

[21] Appl. No.: 183,008

[22] Filed: Apr. 18, 1988

[30] Foreign Application Priority Data

Apr. 17, 1987 [JP] Japan .................. 62-094929

[51] Int. Cl.4 ............................... F16D 65/21
[52] U.S. Cl. .................... 188/72.1; 188/156; 188/162
[58] Field of Search .............. 188/72.1, 72.6, 72.7, 188/72.8, 106 A, 106 P, 156, 157, 158, 162, 217, 325

[56] References Cited

U.S. PATENT DOCUMENTS

| 3,809,191 | 5/1974 | Woodward | 188/162 X |
| 4,175,645 | 11/1979 | Brinkert | 188/72.1 |
| 4,327,414 | 4/1982 | Klein | 188/158 |
| 4,602,702 | 7/1987 | Ohta et al. | 188/72.1 |
| 4,629,039 | 12/1986 | Imoto et al. | 188/72.1 |
| 4,658,939 | 4/1987 | Kircher et al. | 188/72.8 X |
| 4,705,323 | 11/1987 | Imoto et al. | 188/72.1 X |

FOREIGN PATENT DOCUMENTS 61-180582 8/1986 Japan .
61-191278 8/1986 Japan .
1204376 9/1970 United Kingdom .

*Primary Examiner*—Duane A. Reger
*Attorney, Agent, or Firm*—Lyon & Lyon

[57] ABSTRACT

A brake device comprising an ultrasonic motor having a rotor rotatable by an elastic traveling wave generated by a piezoelectric vibrator on a stator of the motor, and torque converting means for converting a rotating torque produced by said ultrasonic motor into a pressing force for pressing a friction member against a member to be braked, which pressing force is transmitted to said friction member.

9 Claims, 3 Drawing Sheets

BRAKE DEVICE

BACKGROUND OF THE INVENTION

1. Field of the Invention

The present invention relates to a brake device having an electric motor employed as a drive source for pressing a friction member against a member to be braked, thereby producing a braking force.

2. Description of the Prior Art

Heretofore, an electric brake device having a wound-rotor type motor used as a drive source for braking automobiles has been proposed. In such an electric brake device, in order to obtain a necessary and sufficient braking torque, the wound-rotor type motor used had to be large in size and heavy in weight. Therefore, the electric brake device presents an installation problem and poses a disadvantage with respect to the battery power supply owing to its large power consumption.

OBJECT OF THE INVENTION

In view of the above difficulties, it is an object of the present invention to provide a brake device driven by an electric motor suitable for use in an automobile and, in particular, a brake device that is small in size, light in weight, and capable of producing necessary and sufficient braking forces with only a small power consumption.

SUMMARY OF THE INVENTION

With the object as described above, there is provided in accordance with the present invention a brake device comprising an ultrasonic motor having a stator, a rotor and a piezoelectric vibrator mounted on said stator to produce an elastic travelling wave to rotate said rotor, and torque converting means for converting a rotating torque produced by said ultrasonic motor, through a speed reducing gearing for increasing a torque and/or a linear converting mechanism for converting a rotating torque to a linear propulsion force, into a pressing force for pressing a friction member against a member to be braked, said pressing force being transmitted to said friction member.

DESCRIPTION OF THE PREFERED EMBODIMENTS

Embodiments of the present invention will hereinafter be described in detail with reference to the accompanying drawings.

Figure 1:
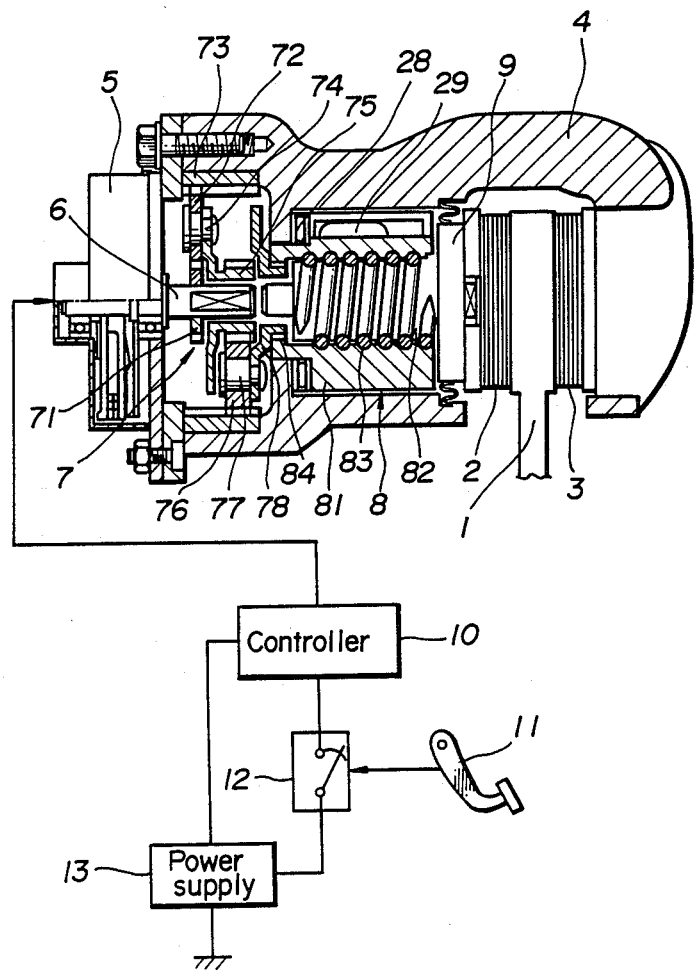
FIG. 1 is a cross-sectional view of a brake device according to an embodiment of the present invention.

FIG. 1 shows an embodiment of the present invention which is applied to a disc-type brake device which includes a brake pad 2 arranged at one side of a disc rotor 1 of an automobile wheel and a brake pad 3 mounted on a caliper 4, so that the disc rotor 1 is sandwiched between the brake pads 2 and 3 and the brake pad 2 is pressed against one side of the disc rotor to produce braking action. An ultrasonic motor 5 is mounted on the caliper 4. The untrasonic motor 5 comprises a rotor and a stator having a piezoelectric vibrator mounted thereon. The rotor is driven by an elastic traveling wave genertaed from the piezoelectric vibrator. The ultrasonic motor hs output shaft 6, the rotating speed of which is reduced by a planetary gear mechanism 7 for an increased torque and then the rotation of the output shaft 6 is transmitted to a linear converter mechanism 8 by which the rotation is converted into a linear movement that presses a pressure plate 9 on which the brake pad 2 is mounted against the disc rotor 1.

The planetary gear mechanism 7 comprises a first sun gear 71 mounted on the output shaft 6, a planet gear 72 disposed between and meshing with the sun gear 71 and an internal gear 73 attached to the caliper 4, a second sun gear 75 mounted on the planet gear 72 by a planet carrier 74, a planet gear 76 disposed between and meshing with the second sun gear 75 and the internal gear 73, and a coupling gear 78 mounted on the planet gear 76 by a planet carrier 77.

The linear converter mechanism 8 comprises a hollow ball nut 81 rotatably mounted in the caliper 4 by bearings 28, 29, and a ball screw 82 threadedly engaged in the ball nut 81 with balls 83 therebetween and axially movable in response to rotation of the ball nut 81. The ball nut 81 has a gear 84 formed on one end thereof which is held in mesh with a coupling gear 78 of the planetary gear mechanism 7, so that the rotation of the planetary gear mechanism 7 can be transmitted to the ball nut 81. The pressure plate 9 is fixed to the ball screw 82.

A controller 10 reads a signal from a potentiometer 12 which is indicative of the amount of depression of a brake pedal 11. The controller 10 then applies a motor drive voltage controlled to produce a torque dependent on the amount of depression of the brake pedal 11 to the ultrasonic motor 5. Denoted at 13 is a power supply.

In operation, when the brake pedal 11 is depressed, the ultrasonic motor 5 is energized under the control of the controller 10 dependent on the amount of depression of the brake pedal 11. The speed of rotation of the output shaft 6 is reduced by the planetry gear mechanism 7 for an increased torque. Then, the rotation form the output shaft 6 is converted by the linear converter mechanism 8 into a linear movement that causes the pressure plate 9 to press the brake pad 2 against the disc rotor 1. The disc rotor 1 is clamped between the brake pads 2, 3 to produce braking forces commensurate with the amount of depression of the brake pedal 11.

Figure 2:
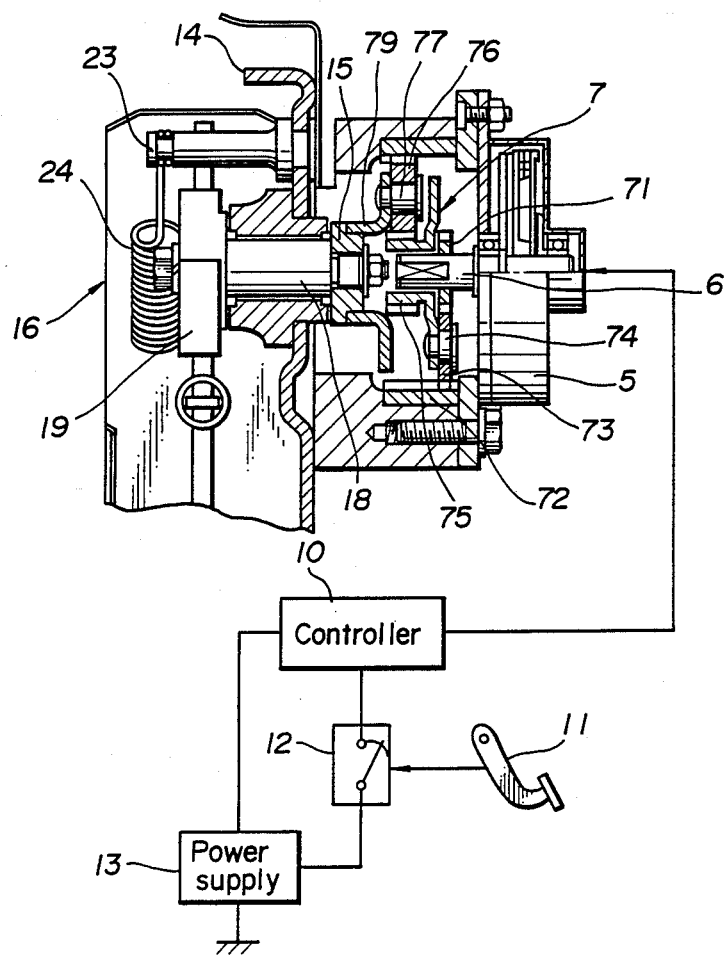
FIG. 2 is a cross-sectional view of a brake device according to another embodiment of the present invention.
Figure 3:
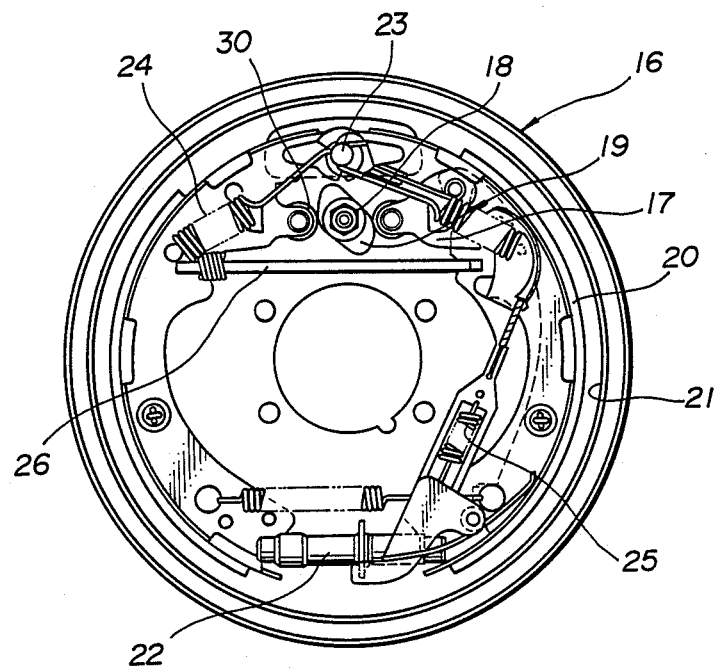
FIG. 3 is a side elevational view of a drum brake in the embodiment of FIG. 2.

FIG. 2 shows another embodiment of the present invention which is applied to a drum-type brake device. The brake device includes an ultrasonic motor 5 mounted on a back plate 14. The ultrasonic motor 5 has an output shaft 6, the rotating speed of which is reduced by a planetary gear mechanism 7 for an increased torque. The rotation is then transmitted through a rotatable shaft 15 coupled to splines 79 on the output member of the planetary gear mechanism 7 to rotate an eccentric camshaft 18 which spreads out lining plates 17 in a drum brake 16 (FIG. 3). The lining plates 17 have rollers 30 engaging a cam 19 of the eccentric camshaft 18 so that the lining plates 17 can easily be spread outwardly by the cam 19. The planetary gear mechanism 7 if of substantially the same structure as that of the planetary mechanism shown in FIG. 1. Therefore, identical parts of the planetary gear mechanism 7 are denoted by identical reference numerals in FIG. 1.

In operation of the brake device of FIGS. 2 and 3, when the brake pedal 11 is depressed, the ultrasonic motor 5 is energized under the control of the controller 10 dependent on the amount of depression of the brake pedal 11. The speed of rotation of the output shaft 6 is reduced by the planetary gear mechanism 7 for an increased torque. Then, the rotation causes the shaft 15 to rotate the eccentric camshaft 18 through a predetermined angle, whereupon the cam 19 spreads the lining plates 17 outwardly to press linings 20 against a drum surface 21, thereby generating braking forces commensurate with the amount of depression off the brake pedal 11. The drum brake 16 shown in FIG. 3 has an automatic adjuster for keeping the clearance between the linings 20 and the drum surface 21 at a constant level as the linings 20 are worn. Denoted at 22 is such an adjuster, 23 an anchor pin, 24 return springs for the lining plates 17, 25 an overload spring, and 26 a strut.

As descrived above, the brake device of the present invention employs an ultrasonic motor 5 as a drive source for effecting braking operation. since the moment of inertia of the rotor of the ultrasonic motor 5 is small, highly accurate braking forces can be produced which are highly responsive to the depression of the brake pedal 11, with the output torque being precisely controlled dependent on the amount of depression of the brake pedal 11.

The ultrasonic motor 5 itself, serving as drive source for generating necessary and sufficient braking torque, is smaller and lighter than the ordinary wound-rotor type motor, and can appropriately be installed in position. The ultrasonic motor can produce a large braking torque with a small power consumption, and hence is advantageous for use with a battery power supply.

When the ultrasonic motor 5 is de-energized it produces a large retentive torque, preventing the output shaft from becoming free as is the case with the ordinary wound-rotor type motor. It is thus possible to arrange the brake device to provide a parking brake function when the power supply is cut off.

Although not shown, the speed of rotation of the disc rotor 1 may be detected by a rotation sensor, and the speed of travel of the automobile is detected by a speed sensor. The controler 16 may read output signals from thses sensors, respectively, and determines a slip rate of th automobile according to a predetermined formula. If the determined slip rate is higher than preset threshold, then the controller 10 may determine that the automobile is skidding. In this manner, an anti-lock braking capability may be provided for turning on and off the ultrasonic motor 5 to effect pumping brake action under the control of the controller 10.

It will be understood that the brake device of the invention employs an ultrasonic motor as a brake drive source, and the torque of the ultrasonic motor is effectively converted. The brake device as a whole is small in size and light in weight, and can procduce necessary and sufficient braking forces with a small power consumption. The brake device is also capable of well controllable and highly responsive braking control.

We claim:

1. A brake device arranged to press a friction member against a member to be braked, thereby applying a braking action to said member to be braked, said brake device comprising;

an ultrasonic motor including a stator, a rotor and a piezoelectric vibrator mounted on the stator to generate an elastic travelling wave to drive said rotor; and torque converting means for converting a rotating torque produced by said ultrasonic motor into a pressing force for pressing the friction member against the member to be braked, said pressing force being transmitted to said friction member.

2. A brake device according to claim 1, in which said torque converting means includes a speed reducing gearing for increasing the rotating torque produced by the motor and a linear converting the increased rotating torque to a linear propulsion force, which is used to press a brake pad against a disk rotor of a disk-type brake device.

3. A brake device according to claim 1 in which said torque converting means includes a speed reducing gearing for increasing the rotating torque produced by the motor and an eccentric camshaft driven by the increased rotating torque of the speed reducing gearing, said eccentric camshaft having a cam thereon which is arranged to spread out lining plates of a drum-type brake device.

4. A brake device comprising:

an ultrasonic motor including a stator having a pieozelectric vibrator mounted thereon and a rotor driven by an elastic traveling wave generated from said piezoelectric vibrator;

torque converting means having a speed reducing gearing for increasing a torque, in which a rotating torque produced by said ultrasonic motor is converted by said torque converting means into a pressing force for pressing a friction member against a member to be braked, said pressing force being transmitted to said friction member.

5. A brake device according to claim 4, in which said torque converting means includes a linear converting mechanism for converting the rotating torque increased by said speed reducing gearing into a linear propulsion force, and the linear propulsion force produced by the linear converting mechanism is used to press a brake pad of a disk-type brake device against a disk rotor.

6. A brake device according to claim 4, in which said torque converting means includes an eccentric camshaft arranged to be rotated by the rotating torque which is increased by the speed reducing gearing, and a cam of said camshaft is used to expand a lining plate of a drum-type brake device.

7. A brake device according to claim 5 or 6, in which the speed reducing gearing is planetary gear mechanism.

8. A brake device according to claim 5, in which said linear converting mechanism includes a hollow ball nut rotatably mounted in a caliper of the brake device by means of a bearing and a ball screw threadedly engaged in said ball nut for axial movement by rotation of said ball nut.

9. A brake device according to claim 1, 4, 5, 6 or 8 including means for detecting an amount of depression of a brake pedal to produce a signal indicating the amount of depression, and a controller for controlling the ultrasonic motor to produce a braking force dependent upon the amount of depression of the brake pedal in accordance with said signal.

* * * * *